United States Patent [19]

Kitamura

[11] Patent Number: 4,995,502
[45] Date of Patent: Feb. 26, 1991

[54] PALLET CHANGER

[75] Inventor: Koichiro Kitamura, Takaoka, Japan

[73] Assignee: Kitamura Machinery Co., Ltd., Toyama, Japan

[21] Appl. No.: 419,953

[22] Filed: Oct. 11, 1989

[30] Foreign Application Priority Data

Oct. 17, 1988 [JP] Japan .................. 63-259395

[51] Int. Cl.$^5$ ............................................ B65G 37/00
[52] U.S. Cl. .............................. 198/346.1; 198/465.1
[58] Field of Search ............... 198/346.1, 465.1, 465.2; 29/33 P, 563

[56] References Cited

U.S. PATENT DOCUMENTS

| | | | |
|---|---|---|---|
| 4,279,337 | 7/1981 | Kachnik | 198/465.1 |
| 4,498,571 | 2/1985 | Nomura et al. | 198/346.1 |
| 4,715,490 | 12/1987 | Date et al. | 198/346.1 |
| 4,797,989 | 1/1989 | Cherko | 198/346.1 X |
| 4,799,582 | 1/1989 | Itoh | 198/346.1 |

Primary Examiner—H. Grant Skaggs
Assistant Examiner—Cheryl L. Gastineau
Attorney, Agent, or Firm—Ronald P. Kananen

[57] ABSTRACT

A pallet changer includes a support, a table movable on the support along one direction, a plurality of pallets for holding a workpiece, a drive mechanism for moving the table, a transfer device for moving the pallet along the one direction relative to the table. The transfer device comprises a pinion shaft rotatably mounted on the table, the pinion shaft having sprockets at opposite ends thereof and a pinion at an intermediate portion thereof, a rack member movably mounted on the support, a rack displacing member mounted on the support for moving the rack member between a first position wherein the rack member can engage the pinion and a second position wherein the rack member can disengage the pinion, counter sprockets rotatably mounted on the table each cooperating with the sprocket of the pinion shaft, chains each placed between the sprocket and the counter sprocket, and an engaging mechanism for detachably engaging the chains and the pallet. The engaging mechanism includes chain hooks fixed to the chains and pallet hooks fixed to the pallet. When the rack is in the first position and the chain hook engages the pallet hook, the table is moved along the one direction by the drive mechanism so that the pinion is rotated and moved along the one direction relative to the rack, whereby the sprockets and the chains are rotated so that the pallet is moved along one direction relative to the table by drive force of the drive mechanism.

8 Claims, 16 Drawing Sheets

PALLET CHANGER

BACKGROUND OF THE INVENTION

The present invention relates to a pallet changer suitable for use with a machine tool.

A flexible manufacturing system (FMS) comprises a machine tool and a pallet changer. The pallet changer exchanges a pallet set on the table of the machine tool for another pallet. The conventional pallet changer has an exclusive hydraulic cylinder or chain drive for moving a pallet.

In the pallet magazine of a hydraulic type, a pallet is moved on the table of the machine tool by a hydraulic cylinder. Once a machining operation on a workpiece set on the pallet is completed, the pallet is moved away from the table by the hydraulic cylinder.

In the pallet magazine of a chain type, a plurality of pallets are set on the chain at the same intervals. The chain is driven by a motor and the pallet is indexed in front of the table of the machine tool.

A pallet and a workpiece are considerably heavy. Therefore, a large hydraulic cylinder, a large driving motor and a heavy chain are required. Such a pallet magazine is large in size and has a complicated structure.

On the other hand, in case the pallets and the works are driven by such a large hydraulic cylinder or a driving motor, they are inevitably shocked because of a large inertial force. To carry the pallet and work without shock, the large hydraulic cylinder or the large driving motor must be operated very slowly. Thus, it takes a lot of time to exchange pallets.

SUMMARY OF THE INVENTION

It is an object of the present invention to provide a pallet changer suitable for exchanging large pallets.

It is another object to provide a pallet changer construction which is simple without both an exclusive large hydraulic cylinder and large motor for moving pallets, and which is manufactured at a lower cost than the conventional pallet magazines.

According to this invention, a pallet changer includes a support, a table movable on the support along one direction, a plurality of pallets for holding a workpiece, a drive means for moving the table along the one direction, a transfer means for moving the pallet along the one direction relative to the table when the table is moved by the drive means. The transfer means comprises a pinion shaft rotatably mounted on the table, the pinion shaft having sprockets at the opposite ends thereof and a pinion at the intermediate portion thereof, a rack member movably mounted on the support, a rack displacing means mounted on the support for moving the rack member between a first position wherein the rack member can engage the pinion and a second position wherein the rack member can disengage the pinion, counter sprockets rotatably mounted on the table each cooperating with the sprocket of the pinion shaft, chains each placed between the sprocket and the counter sprocket, and means for detachably engaging the chains and the pallet, the engaging means including chain hooks fixed to the chains and pallet hooks fixed to the pallet. When the rack is in the first position to engage the pinion and the chain hook engages the pallet hook, the table is moved along the one direction by the drive means so that the pinion is rotated and moved along the one direction relative to the rack, whereby the sprockets and the chains rotate so that the pallet is moved along one direction relative to the table by the drive force of the drive means.

The rack member is preferably an elongated bar having a rack on an upper portion thereof. The bar is preferably pivotably mounted on the support about a horizontal shaft disposed at one end of the bar.

The displacing means preferably includes a cam for swinging the bar. The cam is preferably driven by a motor. The cam is preferably a cylindrical eccentric cam. The cam has preferably has a bearing means on the outer surface thereof.

The pallet hook preferably has a convex portion for engagement with the chain hook.

According to this invention, a pallet changer includes a support, a saddle movable on the support along a Y-axis, a table movable on the saddle along an X-axis perpendicular to the Y-axis, a plurality of pallets each for holding a workpiece to be machined and having a pallet hook, a first drive means for moving the saddle along the Y-axis, a second drive means for moving the table along the X-axis, and a transfer means for moving the pallet along the X-axis relative to the table when the table is moved by the second drive means. The transfer means comprises a pinion shaft rotatably mounted on the table, the pinion shaft having sprockets at the opposite ends thereof and a pinion at an intermediate portion thereof with chains having chain hooks engaging the sprockets, a rack member movably mounted on the saddle, and a rack member displacing means mounted on the saddle for moving the rack member between a first position wherein the rack member can engage the pinion and a second position wherein the rack member can disengage the pinion. When the rack member is in the first position to engage the pinion and the chain hook engages the pallet hook, the table is moved along the X-axis by the second drive means so that the pinion is rotated and moved along the one direction relative to the rack, whereby the sprockets and the chains are rotated so that the pallet is moved along the X-axis relative to the table by a drive force of the transfer means.

In the pallet changer according to this invention, the pallet is moved by the second drive means for moving the table by way of the transfer means comprising the rack, the pinion, the chains and the sprockets. The pallet changer according to this invention has neither an exclusive large oil cylinder nor a motor for moving the large pallet. Therefore, the pallet changer can have a simple structure and can be manufactured at a lower cost than conventional pallet changers.

BRIEF DESCRIPTION OF THE PREFERRED EMBODIMENT

Figure 1:
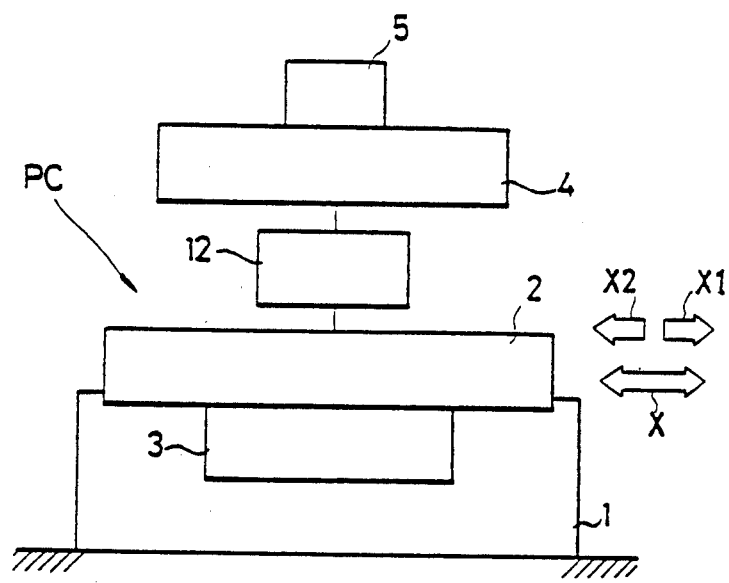
FIG. 1 is a schematic diagrammatic view showing a pallet changer according to this invention.

Referring to FIG. 1, a pallet changer PC includes a pallet 4 on a table 2 and other pallets 14 beside the table. The table 2 is mounted on an upper portion of a support 1 in the pallet changer PC. The table 2 can be driven by a drive means 3 such as a servomotor along at least one direction, for instance an X-axis. The pallet is detachably and slidably set on the table 2.

A transfer means 12 is to move the pallet 4 in one direction X1 or other direction X2 along the X-axis. When the table 2 is moved in the direction X1 or X2 by the drive means 3, the pallet 4 is also moved relative to the table 2 by a drive force of the drive means 3.

The pallet 4 is moved by the drive force of the drive means 3 only, and any other drive means besides the drive means 3 such as an oil cylinder or a motor is not necessary.

As shown in FIGS. 4–7, the transfer means 12 comprises a pinion shaft 95, a rack 94, a rack displacing means 100, sprockets 64, 64, chains 66, 66 and engaging means 67, 67.

The pinion shaft 95 has sprockets 65, 65 at the opposite ends thereof and a pinion 96 at an intermediate portion thereof. The pinion shaft 95 is rotatably mounted on the table 2.

The rack 94 is movably mounted on the support 1 between one position wherein the rack 94 can engage the pinion 96 and other position wherein the rack 94 can disengage the pinion 96.

The rack displacing means 100 is mounted on the support 1. The rack displacing means 100 moves the rack 94 between the first position wherein the rack can engage the pinion 96 and the second position wherein the rack can disengage the same. In the shown embodiment, a saddle 8 is slidably mounted on the support 1 along a Y-axis which is perpendicular to the X-axis. The rack 94 and the rack displacing means 100 are mounted on the saddle 8. The saddle 8 is provided in the support 1.

Counter sprockets 64, 64 to cooperate with the sprockets 65, 65 at the ends of the pinion shaft 95 are mounted on the table 2.

The chain 66, 66 is placed between the sprocket 65, 65 of the pinion shaft 95 and the counter sprocket 64, 64.

The engaging means 67, 67 are to engage detachably the chains 66, 66 and the pallet 4, 14. The engaging means 67, 67 include chain hooks 90 fixed to the chains 66 and pallet hooks 63, 91 fixed to the pallet 4, 14.

When the rack 94 is in a first position to engage the pinion 95 and the chain hook 90 engages the pallet hook 63, the table 2 is moved along the direction by the drive means 3 so that the pinion 95 is rotated and moved along the one direction relative to the rack 94, whereby the sprockets 65 and the chains 66 are rotated so that the pallet 4, 14 is moved along one direction relative to the table 2 by the drive force of the drive means 3.

Figure 11:
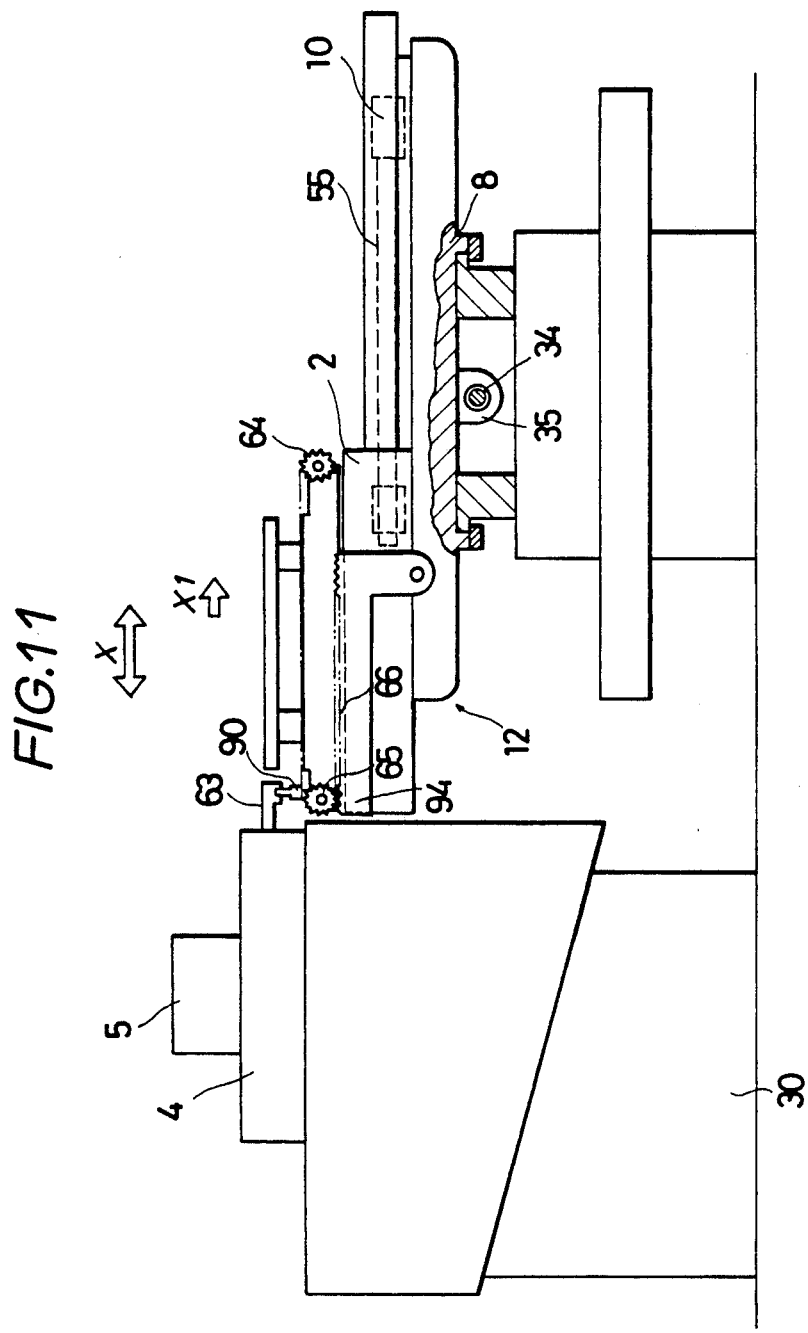
FIG. 11 is a view wherein the pallet is set on the pallet station.
Figure 12:
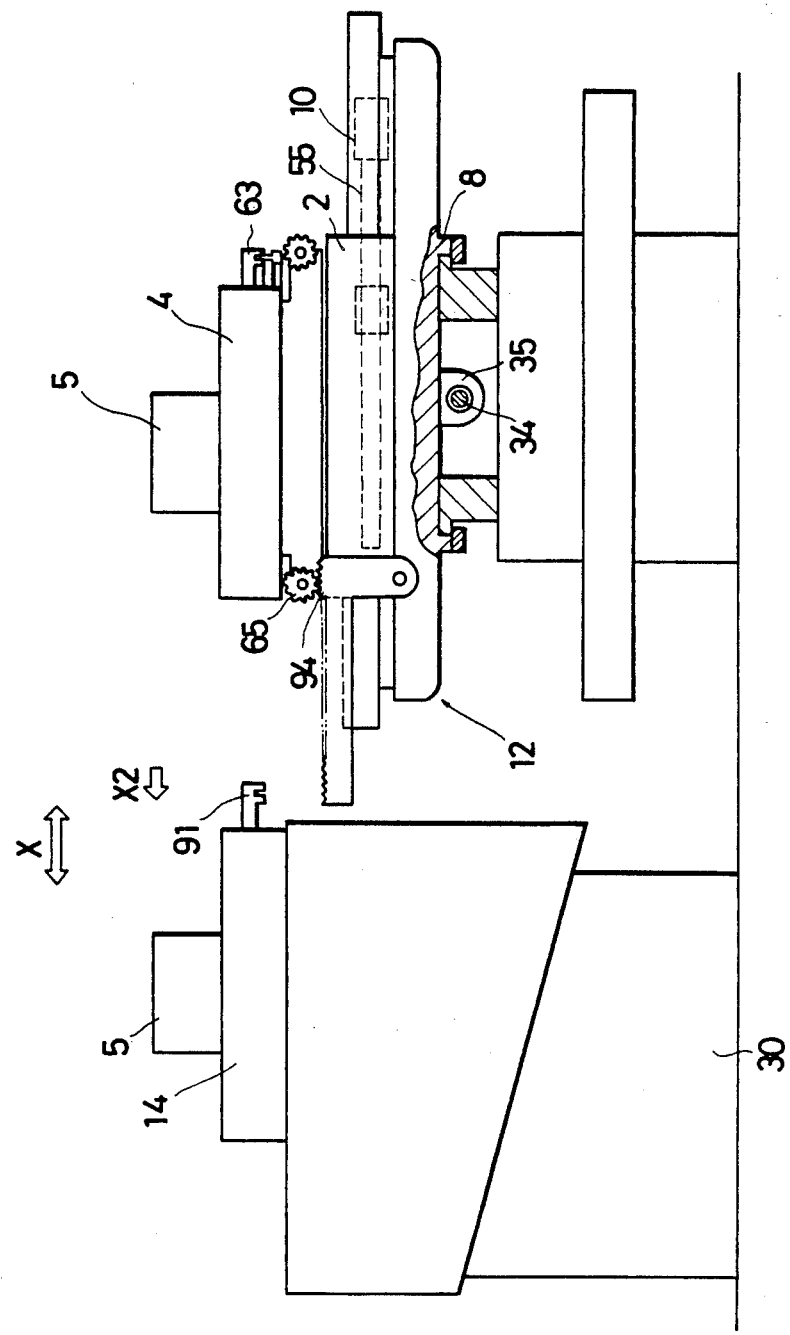
FIG. 12 is a view wherein the pallet is set on the table.

Referring to FIG. 12, when the table 2 is moved in the direction X2, the pallet 4 is simultaneously moved in the direction X2 relative to the table 2 by means of the transfer means 12. The pallet 4 is moved from the table 2 to the pallet station 30 as shown in FIG. 11.

In FIG. 11, when the table 2 is moved in the direction X1, the pallet 4 is simultaneously moved in the direction X1 relative to the table 2 by means of the transfer means 12. The pallet 4 is moved from the pallet station 30 to the table 2 as shown in FIG. 12.

DETAILED DESCRIPTION OF THE PREFERRED EMBODIMENT

As shown in FIG. 1, a pallet changer PC according to this invention comprises a support 1, a table 2, a drive means 3, work carrying pallets 4, 14 and transfer means 12.

The support 1 is set on a floor. The table 2 is mounted on the support 1. The work carrying pallet 4 has a workpiece 5 attached thereon. The pallet 4 is detachably set to the table 2 and can move along the X-axis relative to the table 2.

The table 2 is moved by the drive means 3 in one direction X1 or in another direction X2 along the X-axis relative to the support. The transfer means 12 can move the pallet 4 in the direction X1 or X2 when the table 2 is moved in the direction X1 or X2.

Figure 2:
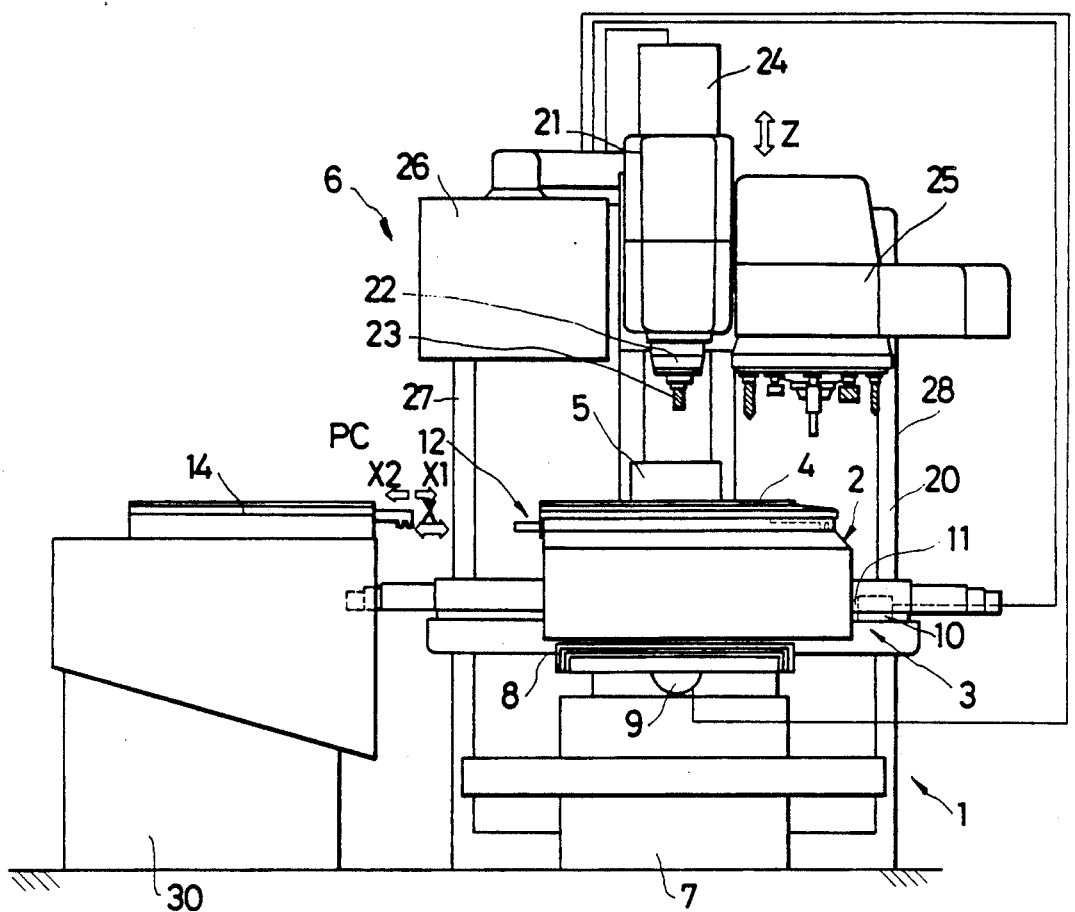
FIG. 2 is a front view showing a machining center comprising the pallet changer according to this invention.

As shown in FIG. 2, a vertical machining center 6 includes the pallet changer PC according to this invention. The support 1 comprises a bed 7 and a saddle 8. A servomotor 9 for movement along the Y-axis is mounted on the bed 7.

The drive means 3 comprises a servomotor 10 for movement along the X-axis and a ball screw part 11. The table 2 is mounted on the saddle 8. The pallet 4 is detachably and movably along X-axis set on the table 2. The transfer means 12 is provided near the table 2.

A spindle head 21 is mounted on a column 20 of the machining center 6. A tool is attached to a spindle 22 of the spindle head 21. The spindle 22 is driven by a motor 24. An automatic tool changer 25 is provided to the spindle head 21. An operation panel 26, a CNC-device and a control panel 28 are also mounted on the column 20.

The table 2 can move in the one direction X1 or the other X2 by means of the servomotor 10. A pallet station 30 is placed beside the table 2. Another pallet 14 is set on the pallet station 30.

Figure 3:
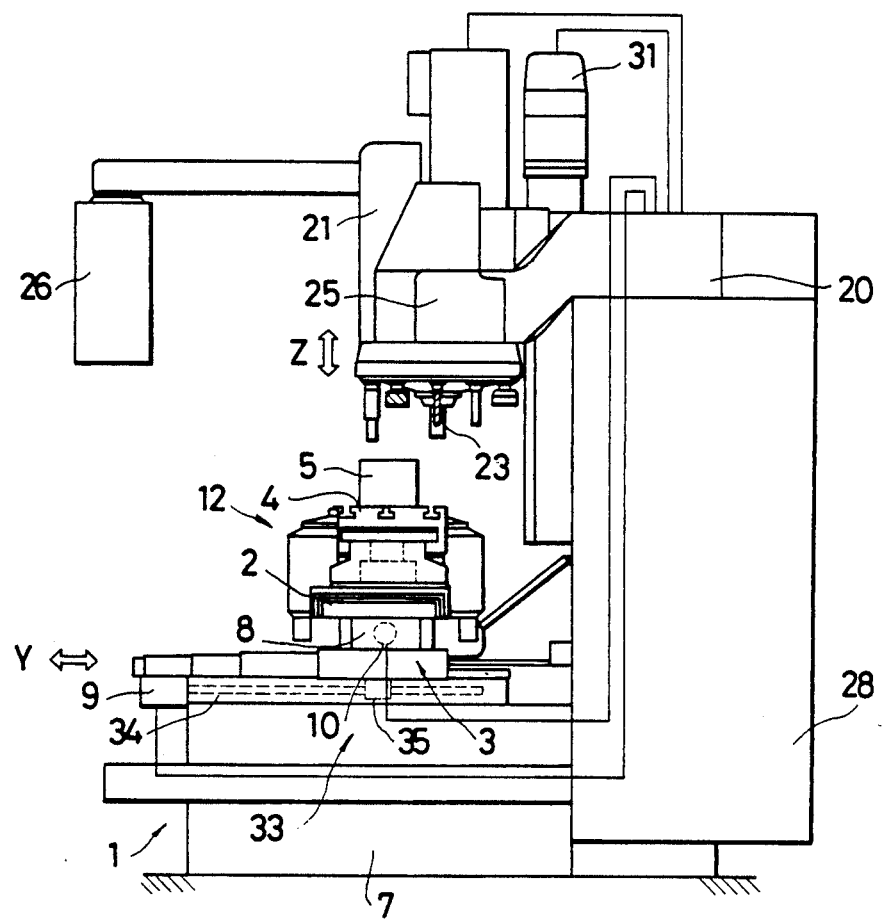
FIG. 3 is a side view showing the machining center.

As shown in FIG. 3, a feed screw 34 of a ball screw part 33 is connected to the servomotor 9. The feed screw 34 engages a nut 35 which is secured to the saddle 8 at an underportion of the saddle. The saddle 8 can be moved along the Y-axis by means of the servomotor 9.

The spindle head 21 can move vertically, or along the Z axis, by means of a servomotor 31. The transfer means 12 is partly shown in FIG. 3.

Figure 4:
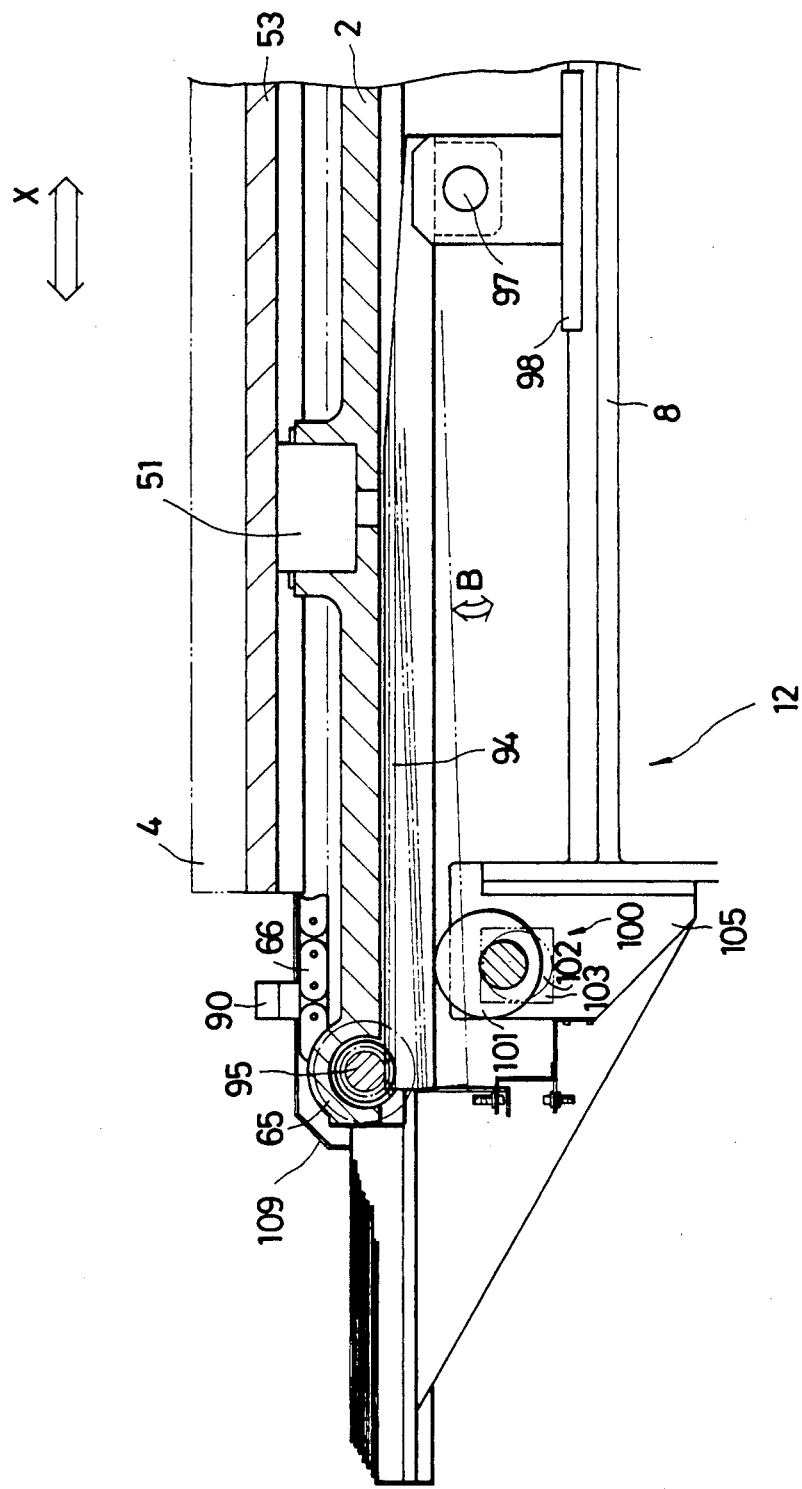
FIG. 4 is a plan view, partly broken, showing a transfer means.
Figure 5:
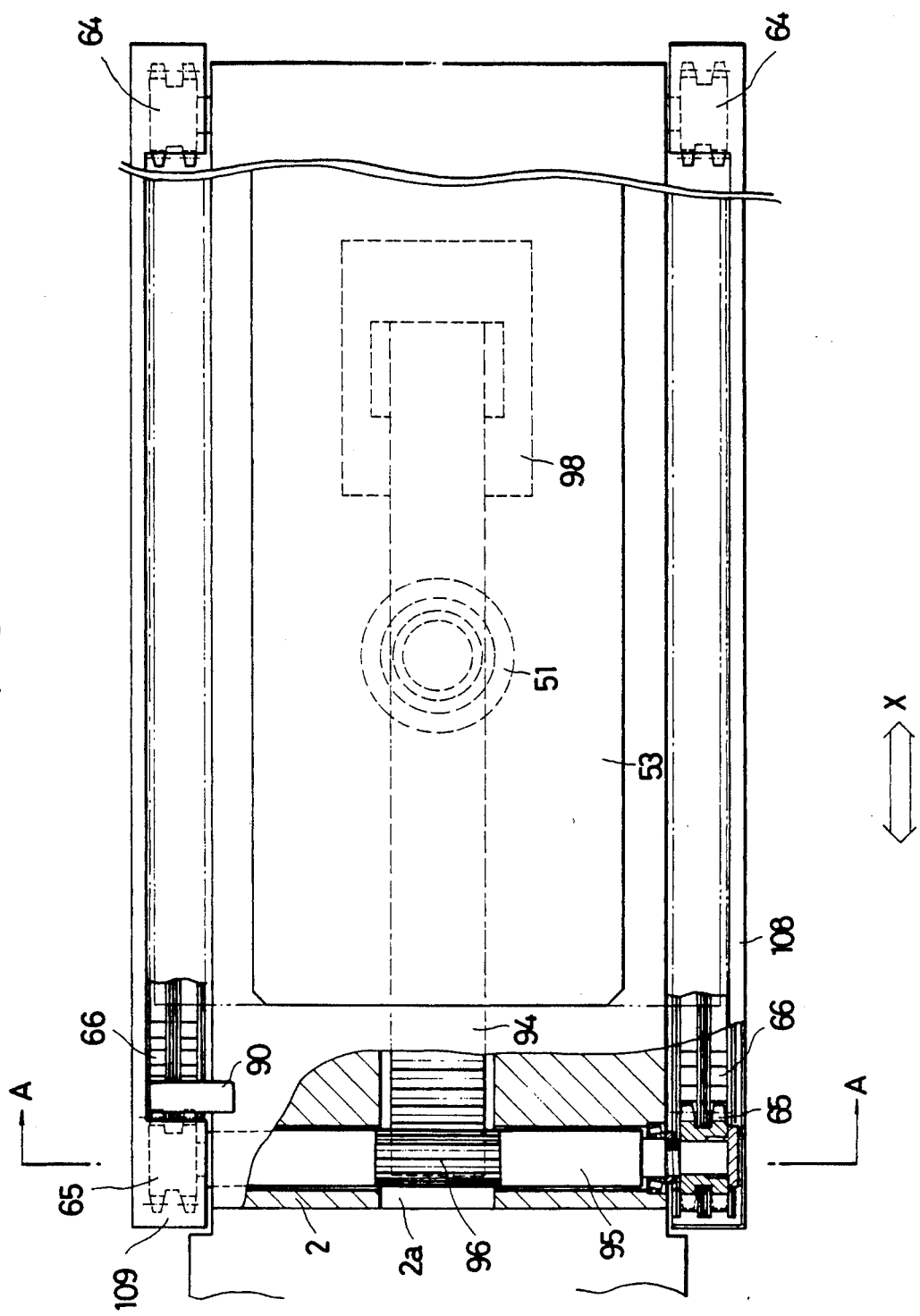
FIG. 5 is a top view, partly broken, showing the transfer means and other means.
Figure 6:
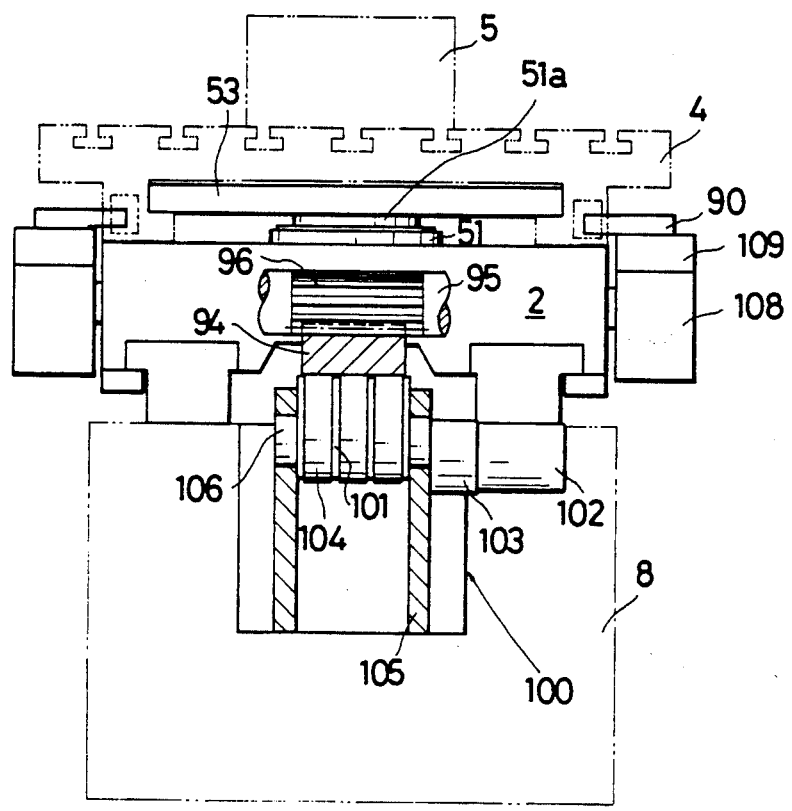
FIG. 6 is a sectional view taken along the line A—A in FIG. 5.

FIG. 4 shows the saddle 8, the table 2, the pallet 4 which is shown by imaginary line, and transfer means 12. FIG. 5 is a top view showing mainly the transfer means 12. FIG. 6 is a sectional view taken along the line A—A in FIG. 5.

The transfer means 12 comprises a rack 94, engaging means 67, 67, chains 66, 66, pinion shaft 95, sprockets 64, 64 and rack displacing means 100.

The pinion shaft 95 is rotatably mounted at a front portion of the table 2. The pinion shaft 95 has a pair of sprockets 65, 65 secured at the opposite ends thereof.

The pinion shaft 95 has a pinion 96 at an intermediate portion thereof.

A pair of sprockets 64, 64 are rotatably mounted on the table 2 at a rear portion of the table.

A chain 66 is placed between the sprocket 65 of the pinion shaft 95 and the sprocket 64 mounted on the table.

A chain hook 90 is attached to the chain 66. The engaging means 67 includes the chain hook 90 and a pallet hook 63. The chain hook 90 has a convex portion. The pallet hook 63 has a concave portion for engaging the convex portion of the chain hook 90. The convex portion and the concave portion are so arranged that the chain hook 90 can move along Y-axis relative to the pallet hook 63 for the engagement and disengagement purpose.

An opening 2a is formed in the table 2 at an intermediate portion of the table. A rack 94 is located beneath the opening 2a.

The rack 94 is swingably mounted on a bracket 98 of the saddle 8 and extends along X-axis. The rack 94 can swing about a shaft 97. The rack 94 can engage the pinion 96 of the pinion shaft 95. The support 1 comprises the saddle 8.

The rack displacing means 100 comprises an eccentric cam 101, a motor 102 and a gear head 103. The rack displacing means 100 is mounted on a bracket 99 of the saddle 8.

The eccentric cam 101 is rotatably mounted on the bracket 99. The top portion of the cam 101 contacts an under face of the rack 94. A shaft of the eccentric cam 101 is connected with the motor 102 by way of the gear head 103. The eccentric cam 101 has bearings at the periphery thereof. The rack 94 acts as a cam follower. The rack swings about the shaft 97, as shown by the arrow B, due to the rotating motion of the eccentric cam 101. The rack 94 engages the pinion 96 when the eccentric cam 101 displaces the rack 94 to its substantially fully uplifted position. The rack 94 disengages the pinion 96 when the eccentric cam 101 displaces the rack 94 downwardly from the uplifted engaging position.

The transfer means 12 is covered by covers 108, 109 so as to shut out chips and cutting oil.

A means for adjusting tension of the chain 66, not shown, is provided at a rear portion of the table, or an opposite side of the pallet station.

A pair of cylinders 51 are mounted on the table. A clamp plate 53 is fixed at the rods 51a of the cylinders 51. In FIG. 6, only one of the cylinders 51 can be seen.

Figure 7:
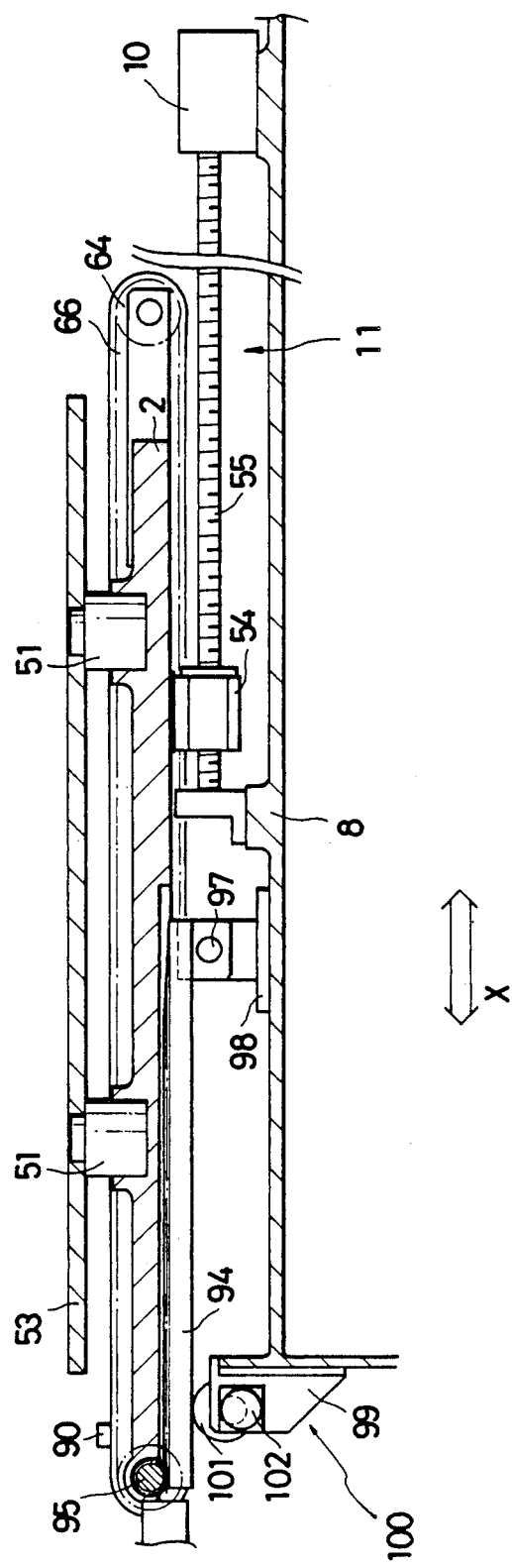
FIG. 7 is a sectional view showing the transfer means and a drive means for a table.

As shown in FIG. 7, a nut 54 is fixed to an under portion of the table 2. The nut 54 engages a feed screw 55 of the ball screw part 11. The feed screw 55 is connected to the servomotor 10, as shown in FIG. 7.

As shown in FIG. 6, the rods 51a of the cylinders 51 are contracted so that the clamp plate 53 clamps the pallet 4 against the table 2.

As the rods 51a of the clamp cylinders 51 are extended, the clamp plate 53 unclamps the pallet 4. In this unclamped condition, the table 2 can be moved along the saddle 8 by the servomotor 10 for exchanging pallets.

Figure 8:
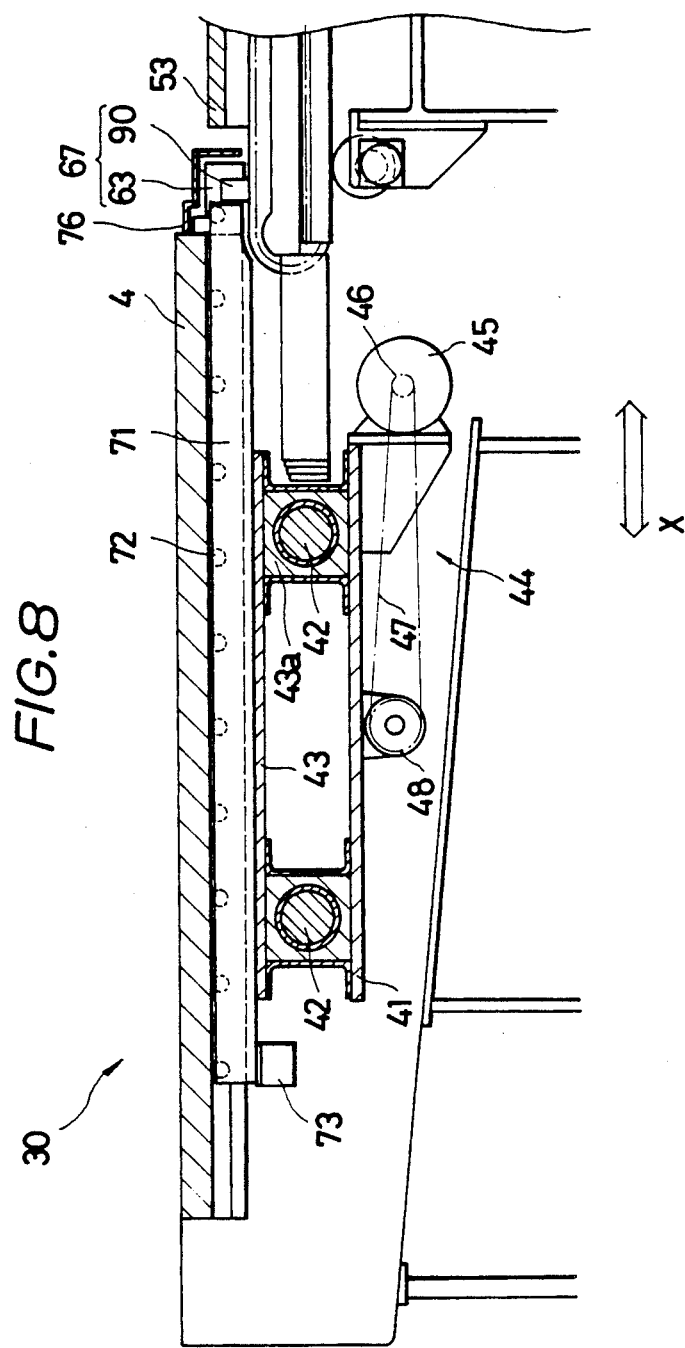
FIG. 8 is a sectional view showing a pallet station.
Figure 9:
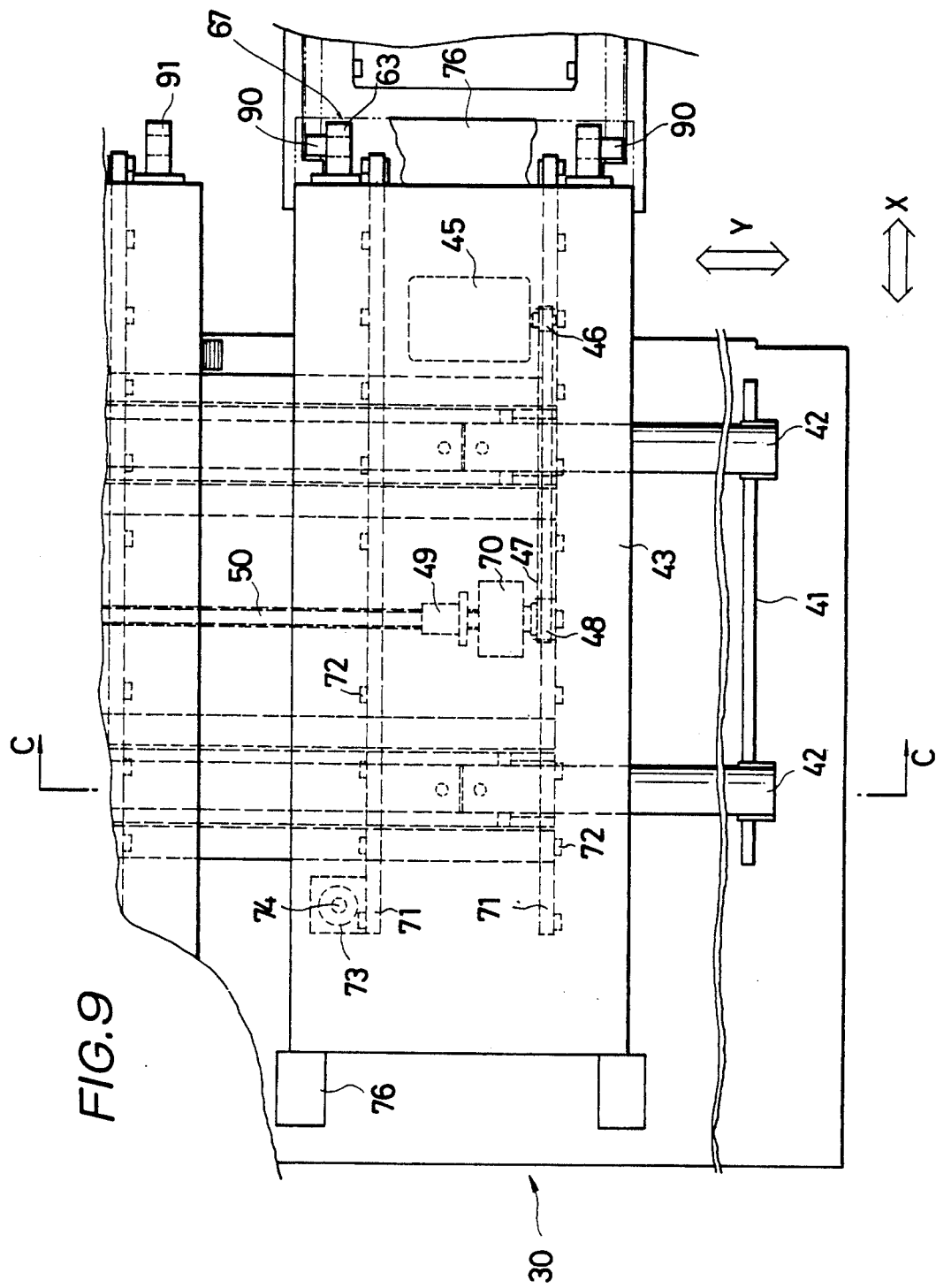
FIG. 9 is a top view showing the pallet station.
Figure 10:
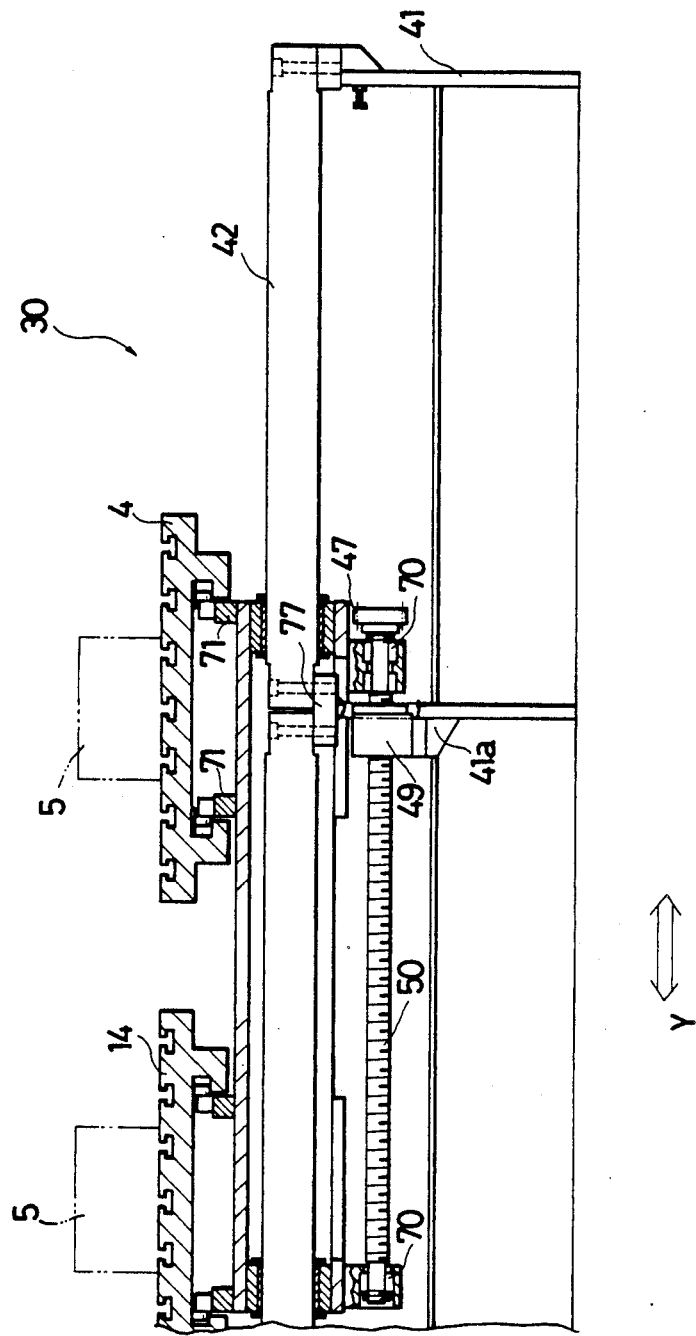
FIG. 10 is a sectional view taken along the line C—C in FIG. 9.

As shown in FIGS. 8 to 10, the pallet station 30 includes two pallets 4, 14 set thereon. A pair of guide shafts 42, 42 are mounted on a frame 41 extending along the Y-axis. A stop member 77 is fixed on the guide shaft 42 at an intermediate portion of the shaft 42.

A transfer means 44 for transferring a slide body 43 is mounted on the frame 41. The transfer means 44 comprises a motor 45, sprockets 46, 48, a chain 47, a nut 49 and a feed screw 50. The motor 45 is secured to an under portion of the slide body 43. The sprocket 46 is fixed to an output shaft of the motor 45. The feed screw 50 is rotatably supported on the under surface of the slide body 43 by means of bearings 70. The sprocket 48 is fixed at one end of the feed screw 50. The chain 47 is placed between the sprockets 46 and 48. The feed screw 50 engages a nut 49 fixed at a frame 41a.

The slide body 43 is moved together with the pallets by means of the transfer means 44. The slide body 43 has two leg portions 43a each having a through-hole formed therein for receiving a guide shaft 42. The guide shaft 42 passes through the through-hole.

The pallets 4, 14 have a pair of pallet hooks 63, 63, 91, 91, respectively, at the end portion thereof. The pallet hook 63, 91 has the concave portion for engaging convex portion of the chain hook 90. The engaging means 67 includes pallet hook 63, 91 and chain hook 90. By means of a pair of pallet hooks 63, 63, 91, 91, a large pallet can be correctly and smoothly moved without slanting.

Rails 71 are mounted on the upper surface of the slide body 43. The pallets 4, 14 are guided by the rails 71 and can move along the X-axis on the slide body 43. The rails 71 have a plurality of rollers 72 for smooth movement of the pallets 4, 14.

A cylinder 73 for fixing the pallet is mounted on one end of the rails. A stopper pin 74 is fixed to a rod of the cylinder 73. As the stopper pin 74 is inserted into a recess (not shown) formed in the pallet 4, the pallet 4 is fixed on the slide body 43. Stop members 76 are mounted on the frame.

The feed screw 50 is rotated by the motor 45 by way of the sprocket 46, the chain 47 and the sprocket 48. When the feed screw 50 rotates, the nut 49 is moved along the feed screw 50. As the nut 49 is fixed to the bracket 41a of the frame 41, the feed screw 50 moves axially or along the Y-axis when the feed screw rotates. Thus, when the motor 45 is driven, the feed screw 50 is moved together with the slide body 43 along the Y-axis.

When the slide body 43 moves along the Y-axis, the pallets 4, 14 also move with it. When the slide body 43 moves, the stopper pins 74 are inserted into the recesses formed in the pallets 4, 14 respectively for fixing the pallets. To the contrary, when the pallet is moved along the X-axis to the table, the stopper pin 74 is retracted from the recess for free movement.

In FIG. 11, the pallet 4 is set on the pallet station 30. The table 2 is located at the left end of the saddle 8. The rack 94 engages the pinion 96. When the table is moved in the one direction X1 by the servomotor 10, the pinion 96 rotates clockwise on the rack 94 and moves in the one direction X1 relative to the rack 94. The pinion shaft 95 and the sprocket 65 rotate clockwise so that the chain 66 simultaneously rotates clockwise. The pallet hook 63 and the pallet 4 are moved with the chain hook 90 in the one direction relative to the table 2.

In this manner, the pallet 4 is moved from the pallet station 30 to the proper portion on the table 2 as shown in FIG. 12.

Thereafter the pallet 4 is clamped to the table 2 as shown in FIG. 6. The eccentric cam 101 is rotated so that the rack 94 disengages the pinion 96. Therefore the chain 66 does not move any more even if the table 2 is moved along X-axis for machining the workpiece 5, or the pallet 4 does not move relative to the table 2.

The workpiece 5 is machined by a tool or tools in a predetermined manner.

As machining on the work 5 is completed, the table 2 is moved back to the pallet station 30 from the table 2, or to the location shown in FIG. 11 from the location shown in FIG. 12 in the following manner. The eccentric cam 101 is rotated so that the rack 94 engages the pinion 96. The pallet 4 is unclamped. The pallet hooks 63 are still in engagement with the chain hooks 90. The table 2 is moved in the direction X2 by the servomotor 10. The pinion 96 rotates counterclockwise on the rack 94 and moves in the direction X2 relative to the rack 94. The chain 66 rotates counterclockwise so that the pallet hooks 63 engaging the chain hooks 90 and the pallet 4 move in the other direction X2 relative to the table 2. The table 2 itself moves in the other direction.

In this manner, the pallet 4 is returned to the pallet station 30 from the table 4.

In FIGS. 11 and 12, the transfer means is shown in an enlarged scale for easy understanding.

In the above mentioned manner, the pallet 4 is set onto the table 2 for machining the workpiece 5 and thereafter returned to the pallet station 30.

Now, referring to FIGS. 13 to 19, the operations of changing the pallets 4, 14 will be described.

Figure 13:
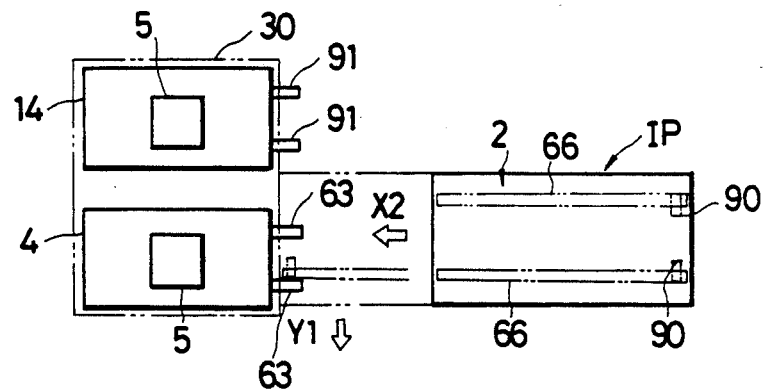
FIGS. 13 to 19 are views showing pallet changing operations.

In FIG. 13, both of the pallets 4, 14 are set on the pallet station 30, and the table 2 is located in its initial position IP. The chain hook 90 is positioned at the right end of the chain 66, 66. The table is moved in the direction X2, and then in the direction Y1.

Figure 14:
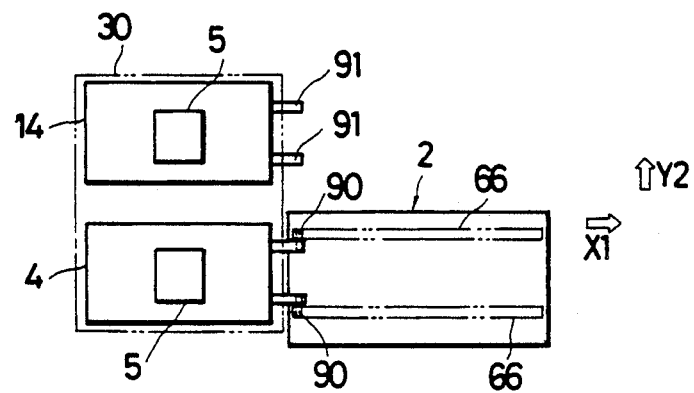
Figure 15:
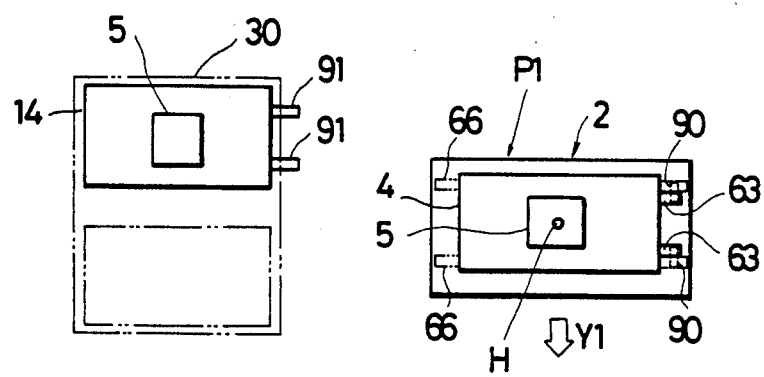

The chain hook 90 is moved to the left end of the chain 60 and engages the pallet hook 63 of the pallet 4 as shown in FIG. 14. The table 2 is moved in the direction X1.

The pallet 4 is moved on the table 2. The table in FIG. 5. The workpiece 5 is worked by the tool 23 set in the spindle 21.

Figure 16:
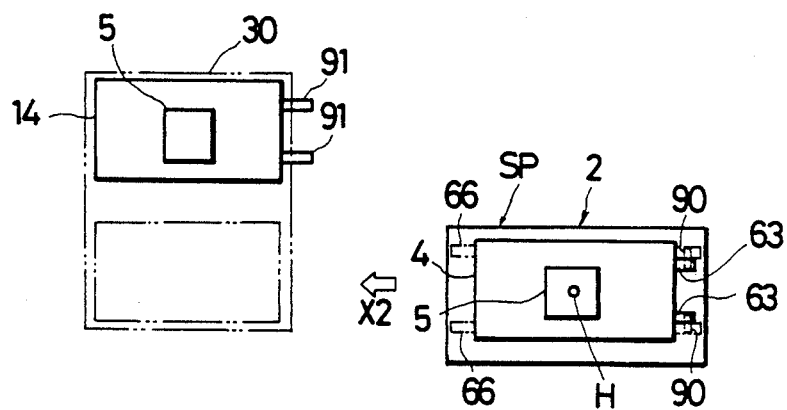

After machining, the table 2 is moved to another position SP as shown in FIG. 16. Further the table 2 is moved in the direction X2. Simultaneously, the pallet 4 is moved in the direction X2 relative to the table 2.

Figure 17:
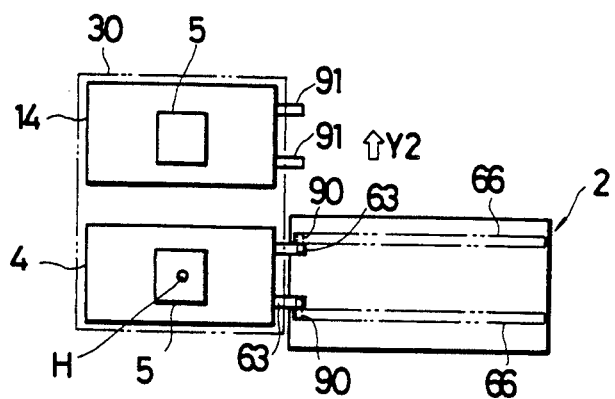

The pallet 4 is returned to the pallet station 30 as shown in FIG. 17. The table 2 is moved in the direction Y2.

Figure 18:
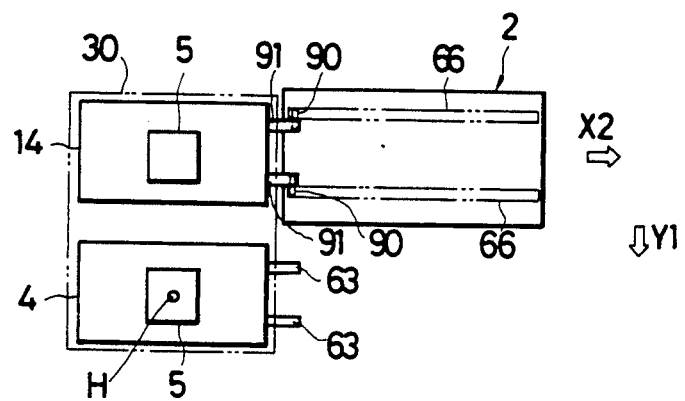

The chain hook 90 disengages the pallet hook 63 and then engages the pallet hook 91 of the pallet 14 as shown in FIG. 18. The table 2 is moved in the direction X1. Simultaneously, the pallet 14 is moved in the direction X1 relative to the table 2.

Figure 19:
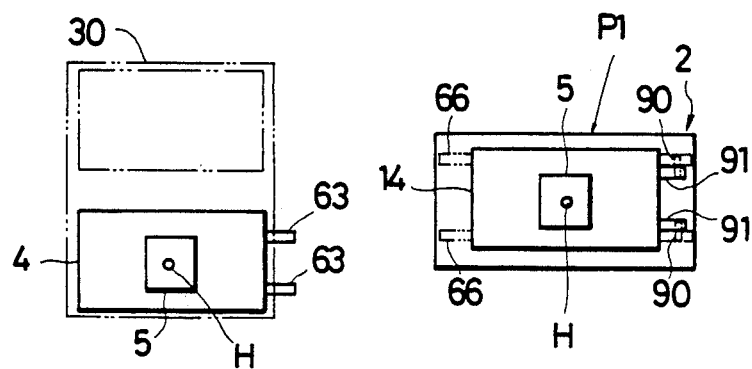

The table 2 is moved to the machining position P1 as shown in FIG. 19 and the workpiece 5 is machined by the tool set in the spindle head 21.

Thus, the pallets 4, 14 are exchanged by moving the table 2 only. The pallets may be exchanged by moving pallets set on the pallet station along the Y-axis instead of moving the table 2 along the Y-axis. This manner will be apparent to those skilled in the art.

This invention is not restricted to the above-mentioned embodiment. For example, the pallet station may be set in front of the vertical machining center, wherein the pallets are exchanged by moving the table along the Y-axis.

The pallet station may be set at a side of a horizontal machining center, wherein the pallets are exchanged by movement of the table along the X-axis. Further, the pallet station may be set in front of the horizontal machining center, wherein the pallets are exchanged by movement of the table along the Z-axis.

The number of pallets set in the pallet station may be three or more.

A pallet changer according to this invention can be used with a general machine having a X-Y table such as an automatic tool assembly machine as well as a machine tool.

Further, an endless type pallet station may be used, wherein a plurality of pallets are simultaneously moved in an orbit such as a shape of doughnut. The pallet station of a linear belt conveyer type may be used. In case only a few number of pallets are available, the pallet station may be a simple table having no drive means for moving pallets.

What is claimed is:

1. A pallet changer including a support (1), a table (2) movable on the support (1) along one direction, a plurality of pallets (4, 14) each for holding a workpiece, a drive means (3) for moving the table (2) along the one direction, a transfer means (12) for moving the pallet (4, 14) along the one direction relative to the table (2) when the table (2) is moved by the drive means (3), the transfer means (12) comprising:

a pinion shaft (95) rotatably mounted on the table (2), the pinion shaft (95) having sprockets (65) at the opposite ends thereof and a pinion (96) at an intermediate portion thereof;

a rack member (94) movably mounted on the support (1);

a rack member displacing means (100) mounted on the support (1) for moving the rack member (94) between a first position wherein the rack member (94) can engage the pinion (96) and a second position wherein the rack member (96) can disengage the pinion (96);

counter sprockets rotatably mounted on the table (2) each cooperating with the sprocket (65) of the pinion shaft (95);

chains (66) each placed between the sprocket (65) and the counter sprocket (64); and engaging means (67) for detachably engaging the chains (66) and the pallet (4, 14), the engaging means (67) including chain hooks (90) fixed to the chains (66) and pallet hooks (63, 91) fixed to the pallet (4, 14), wherein, when the rack member (94) is in the first position to engage the pinion (95) and the chain hook (90) engages the pallet hook (63), the table (2) is moved along the one direction by the drive means (3) so that the pinion (95) is rotated and moved along the one direction relative to the rack member (94), whereby the sprockets (65) and the chains (66) are rotated so that the pallet (4, 14) is moved along the one direction relative to the table (2) by drive force of the drive means (3).

2. A pallet changer as defined in claim 1, wherein the rack member (94) is an elongated bar having a rack on an upper portion thereof, the bar being pivotably mounted on the support (1) about a horizontal shaft (97) disposed at one end of the bar.

3. A pallet changer as defined in claim 2, wherein the displacing means (100) includes a cam (101) for swinging the bar.

4. A pallet changer as defined in claim 3, wherein the cam (101) is driven by a motor (102).

5. A pallet changer as defined in claim 4, wherein the cam (101) is a cylindrical eccentric cam.

6. A pallet changer as defined in claim 5, the cam has a bearing means (104) on an outer surface thereof.

7. A pallet changer as defined in claim 1, wherein the pallet hook (63, 91) has a convex portion for engagement with the chain hook (90).

8. A pallet changer including a support (1), a saddle (8) movable on the support (1) along a Y-axis, a table (2) movable on the saddle (8) along an X-axis perpendicular to the Y-axis, a plurality of pallets (4, 14) each for holding a workpiece to be machined and having a pallet hook, a first drive means (9, 34, 35) for moving the saddle (8) along the Y-axis, a second drive means (3) for moving the table (2) along the X-axis, a transfer means (12) for moving the pallet (4, 14) along the X-axis relative to the table (2) when the table (2) is moved by the second drive means (3), the transfer means (12) comprising:
- a pinion shaft (95) rotatably mounted on the table (2), the pinion shaft (95) having sprockets (65) at opposite ends thereof and a pinion (96) at an intermediate portion thereof, said sprockets engaging chains (66) having at least one chain hook (90);
- a rack member (94) movably mounted on the saddle (8);
- a rack member displacing means (100) mounted on the saddle (8) for moving the rack member (94) between a first position wherein the rack member (94) can engage the pinion (96) and a second position wherein the rack member (96) can disengage the pinion (96);

wherein when the rack member (94) is in the first position to engage the pinion (95) and the chain hook (90) engages the pallet hook (63) of a pallet (4, 14), the table (2) is moved alogn the X-axis by the second drive means (3) so that the pinion (95) is rotated and moved along the one direction relative to the rack member (94), whereby the sprockets (65) and the chains (66) are rotated so that the pallet (4, 14) is moved along the X-axis relative to the table (2) by drive force of the second drive means (3).

* * * * *